(12) United States Patent
Cox, Jr.

(10) Patent No.: US 10,948,118 B1
(45) Date of Patent: Mar. 16, 2021

(54) METHODS, APPARATUS, AND KITS FOR INTERCONNECTING CYLINDRICAL TUBES

(71) Applicant: Seth Barton Cox, Jr., Honolulu, HI (US)

(72) Inventor: Seth Barton Cox, Jr., Honolulu, HI (US)

(73) Assignee: Steinmetz Solid Technology LLC, Honolulu, HI (US)

( * ) Notice: Subject to any disclaimer, the term of this patent is extended or adjusted under 35 U.S.C. 154(b) by 0 days.

(21) Appl. No.: 16/813,409

(22) Filed: Mar. 9, 2020

Related U.S. Application Data

(60) Provisional application No. 62/817,588, filed on Mar. 13, 2019.

(51) Int. Cl.
| | | |
|---|---|---|
| *B21D 39/04* | (2006.01) | |
| *F16L 41/12* | (2006.01) | |
| *F16L 37/26* | (2006.01) | |
| *F16L 41/08* | (2006.01) | |
| *B23P 15/00* | (2006.01) | |

(52) U.S. Cl.
CPC ............... *F16L 41/12* (2013.01); *B23P 15/00* (2013.01); *F16L 37/26* (2013.01); *F16L 41/082* (2013.01)

(58) Field of Classification Search
CPC . F16L 25/14; F16L 41/12; F16L 37/26; F16L 41/082; F16B 7/0446; F16B 7/0493; B21D 39/044; B23P 11/00; B23P 15/00; B16B 17/004
See application file for complete search history.

(56) References Cited

U.S. PATENT DOCUMENTS

| | | |
|---|---|---|
| 548,998 A | 10/1895 | Mannesmann |
| 2,760,799 A | 8/1956 | Smith |
| 3,849,013 A | 11/1974 | Bibb |
| 3,927,950 A | 12/1975 | Herrmann et al. |
| 4,339,864 A | 7/1982 | Seregely |
| 4,631,797 A | 12/1986 | Hill |
| 5,678,865 A | 10/1997 | Anderson |
| 6,688,803 B2 | 2/2004 | Giezen et al. |
| 2009/0175679 A1 | 7/2009 | Brandel et al. |

*Primary Examiner* — Jun S Yoo
(74) *Attorney, Agent, or Firm* — Wanatabe Ing, LLP; Seth M. Reiss

(57) ABSTRACT

A joint comprising two intersecting cylindrical tubes joined orthogonally and reinforced internally by a Steinmetz solid connector having a shape defined by the volume of intersection of the hollow regions of said tubes. The joints can be made releasable or permanently fixed. Methods and kits for building strong orthogonal joints using Steinmetz solid connectors are also described.

14 Claims, 12 Drawing Sheets

METHODS, APPARATUS, AND KITS FOR INTERCONNECTING CYLINDRICAL TUBES

CROSS-REFERENCE TO RELATED APPLICATIONS

This U.S. Non-Provisional Utility Patent Application claims the benefit, under 35 U.S.C. § 119, of U.S. Provisional Patent Application Ser. No. 62/817,588, filed Mar. 13, 2019 by the present inventor, the contents of which are incorporated herein in their entirety.

STATEMENT REGARDING FEDERALLY SPONSORED RESEARCH

The invention described herein was not made pursuant to a government agency grant or contract. No government funds were utilized in the described invention.

FIELD OF THE INVENTION

The present invention is in the technical field of structural joints. More particularly, the present invention describes methods, apparatus, and kits for joining cylindrical tubes orthogonally.

BACKGROUND OF THE INVENTION

Cylindrical tubes are often joined orthogonally, in particular to provide structural support for larger structures.

The most common methods of orthogonally joining two cylindrical tubes involves severing or separating each tube into two segments before joining the segments using an insert or socket connector.

Because each tube is separated in order to be joined, the structural integrity of the joint is significantly reduced. In order to restore some structural strength to the joint, permanent adhesives are commonly employed to bind the tube segments to the connector. Additionally, tube segments and connectors are often threaded to improve structural strength.

One object of the instant invention is to provide a method for joining cylindrical tubes orthogonally without separating each tube into segments before joining. By minimizing the structural modifications to each tube, the remaining inherent structural integrity of the materials is preserved.

A further object of the instant invention is a method of connecting cylindrical tubes orthogonally, employing a connector that maximizes the effective contact surface area of the two tubes, thereby improving the structural integrity of the joint.

A further object of the instant invention is a method for reversibly joining cylindrical tubes in a manner that does not significantly reduce the structural integrity of the resulting joint.

Still a further object of the instant invention is a method for reversibly joining cylindrical tubes orthogonally that allows for quick and efficient assembly/disassembly as well as modularity.

A further object of the instant invention is to produce an orthogonal joint of modern aesthetic, in which surfaces between joint segments lie flush and transition smoothly.

Yet a further object of the instant invention is to provide apparatus of cylindrical tubes joined by means of a Steinmetz solid connector.

Still another object of the instant invention is to provide a kit comprising materials and tools to practice the described methods and construct the described apparatus.

SUMMARY OF THE INVENTION

These and other objects are accomplished in the present invention: methods for orthogonally joining cylindrical tubes, apparatus comprising joints constructed using the methods, and kits which provide requisite tools and materials for performing the methods to construct the apparatus.

A method of the instant invention comprises the following or equivalent steps: (1) providing two cylindrical tubes of equal internal diameter; (2) modifying each tube to demonstrate a cutout at the location of the intended joint; (3) providing a connector in the shape of a bicylinder Steinmetz solid sized for the internal diameter; (4) joining the modified tubes around the connector with tubes aligned orthogonally, cutouts facing one another, and the interior surface of the tubes exposed by the cutouts abutting the surfaces of the connector. The tubes can be joined to one another through permanent adhesion or temporary fastening to form the final assembly.

According to one embodiment of the method, the Steinmetz solid connector comprises a single piece.

According to another embodiment of the method, the Steinmetz solid connector comprises two identical halves each of which is joined with one modified tube to create a half-connector/tube assembly. According to further embodiment of the method, the Steinmetz solid connector comprises four identical quarters, two of which are joined to each one of the modified tubes to create a two quarter-connector/tube assembly.

According to yet additional embodiments of the method of the subject invention, the modified tubes joined by one of the Steinmetz solid connector embodiments are optionally combined with one or more of the following auxiliary parts: (1) stabilizing covers; (2) circular discs; (3) stepped stoppers; and (4) cutout bridges. These auxiliary parts are aligned and affixed to the modified tubes such that the final joint assembly demonstrates additional strength and smooth transitions.

The apparatus of the instant invention comprises two modified cylindrical tubes joined orthogonally and internally reinforced with a Steinmetz solid connector having a shape defined by the volume of intersection of the hollow regions of the tubes when their cylindrical axes intersect orthogonally.

The kit of the instant invention comprises a combination of one or more of the following components: a tool for modifying cylindrical tubes with cutouts of specified width and depth, a Steinmetz solid connector having a shape defined by the volume of intersection of cylindrical volumes of specified equal diameter and orthogonally intersecting cylindrical axes, adhesive for attaching the cylindrical tubes and connector, a strap for optionally securing the joint in a releasable fashion, four stabilizing covers, two or four circular discs, two stepped stoppers, and cutout bridge.

DETAILED DESCRIPTION OF THE INVENTION

Figure 1:
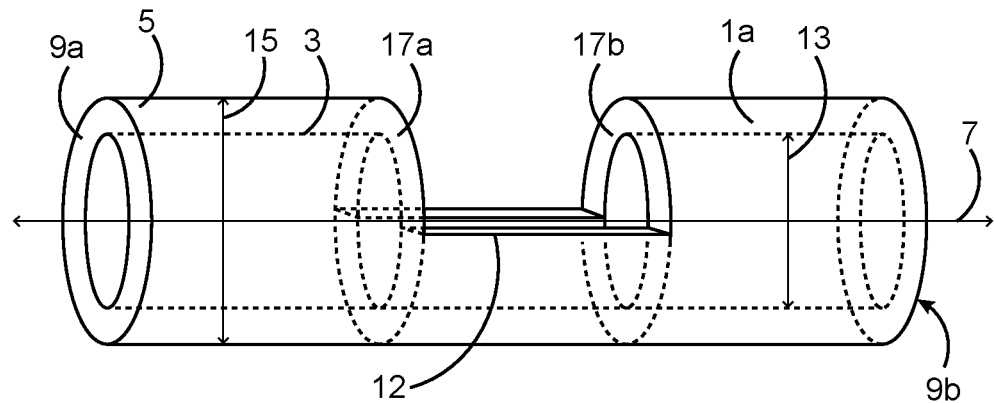
FIG. 1 is a perspective view of one embodiment of a first tube modified according to the second step of a method of the subject invention.

The method of the instant invention comprises the following or equivalent steps: (1) providing two cylindrical tubes of equal internal diameters, (2) modifying each tube at the location of the intended joint with a cutout that exposes the interior surface of each tube; (3) providing a connector in the shape of a bicylinder Steinmetz solid sized for the internal diameter of the tubes; (4) joining the modified tubes around the connector with the tubes aligned orthogonally, cutouts facing one another, and the interior surface of the tube exposed by the cutout abutting the surfaces of the connector.

The method for connecting two tubes of the present invention begins with the first step of providing two cylindrical tubes $1a$ and $1b$. In the preferred embodiment of the subject invention, selected tubes $1a$ and $1b$ are both similar to that shown in FIG. 1. Tubes $1a$ and $1b$ are right circular hollow cylinders, which are a three-dimensional region bounded by an interior right circular cylinder 3 and exterior right circular cylinder 5 having the same central axis 7 and two parallel annular bases $9a$ and $9b$ perpendicular to central axis 7. The interior diameter 13 of the interior cylinders 3 for both tubes $1a$ and $1b$ are equal in length. In a preferred embodiment of the subject invention, the exterior diameter 15 of exterior right cylinder 5 for both tubes $1a$ and $1b$ are also equal in length.

The second step for method for connecting two cylindrical tubes $1a$ and $1b$ of the present invention is modifying first and second tubes $1a$ and $1b$ to demonstrate a cutout 12 of identical dimension on each tube with cutout 12 on each tube centered at the location of the intended joint. FIG. 1 is a perspective view of first tube $1a$ having cutout 12.

Figure 2:
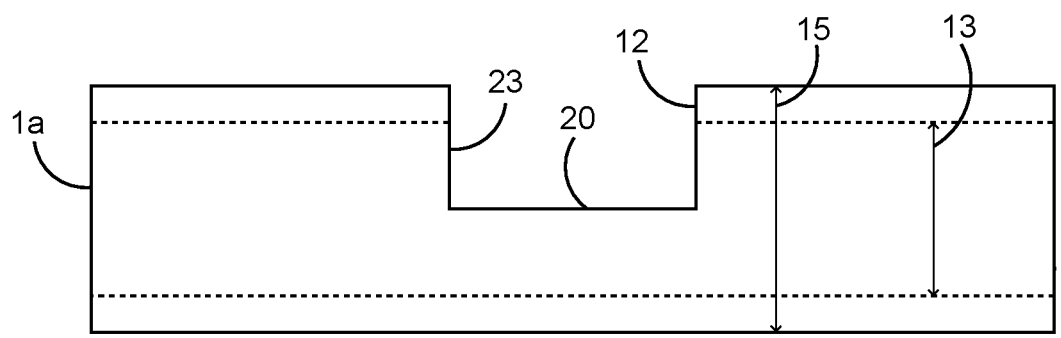
FIG. 2 is a side view of the first tube shown in FIG. 1 modified according to the second step of a method of the subject invention.

FIG. 2 is a side view of tube $1a$ shown in FIG. 1 after the second step of a method of the subject invention. Referring to FIG. 2, the cutout width 20 of cutout 12 is equal to the length of exterior diameter 15 and the cutout depth 23 of cutout 12 is half the length of exterior diameter 15. Once tubes $1a$ and $1b$ are modified with cutouts 12, each cutout 12 creates two exposed half-circular cross sections $17a$ and $17b$ (shown in FIG. 1) that are perpendicular to central axis 7 at either side of cutout 12.

Figure 3A:
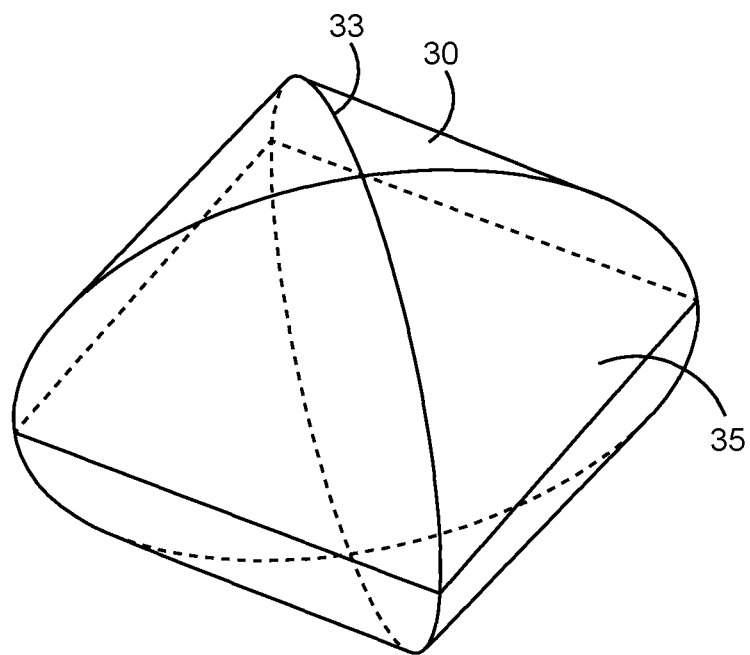
FIG. 3A is a perspective view of one embodiment of the Steinmetz solid shaped connector used in the third step of the method of the subject invention.

After tubes $1a$ and $1b$ are modified to demonstrate cutouts 12 at the location of the intended joint, the next step of the method for connecting tubes $1a$ and $1b$ of the subject invention is providing a connector in the shape of a Steinmetz solid. FIG. 3A is a perspective view of the Steinmetz solid connector 30. A Steinmetz solid is a solid body generated by the orthogonal (right-angle) intersection of two or more cylinders of equal radius, whose axis of rotational symmetry intersect at the same point. In the case where two cylinders intersect, the overlapping space is called a "bicylinder Steinmetz solid" or a tetragonal hosohedron. The subject invention concerns connector 30 of the bicylinder Steinmetz solid variant, where the radius of the two intersecting cylinders that create the bicylinder Steinmetz solid are equal to the length of interior diameter 13 of tubes $1a$ and $1b$. All references to a Steinmetz solid herein refer to the bicylinder Steinmetz solid. The horizontal cross-section of connector 30 is a square with the length of each side equal to interior diameter 13 of tubes $1a$ and $1b$. In other preferred embodiments, connector 30 can be divided into two or more pieces.

Figure 4A:
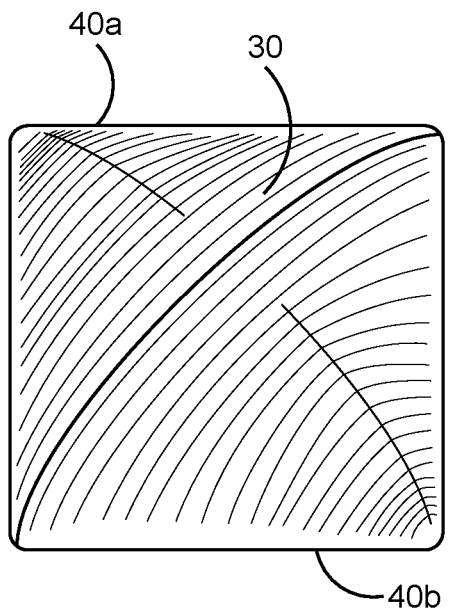
FIG. 4A is a perspective view of another embodiment of the Steinmetz solid shaped connector divided into two pieces identical in shape and size.

In the preferred embodiment shown in FIG. 4A, connector 30 is further divided into two or more pieces such that when the pieces are arranged and placed together, the pieces form a Steinmetz solid. Referring to the preferred embodiment shown in FIG. 4A, connector 30 comprises of two Steinmetz solid halves—$40a$ and $40b$—which are equal in shape and size, and when placed together, as shown in FIG. 4A, creates a Steinmetz solid shape of connector 30. Steinmetz solid halves 40a and 40b are the two pieces resulting from dividing the Steinmetz solid connector 30 along cross section 33 shown in FIG. 3A.

Figure 5A:
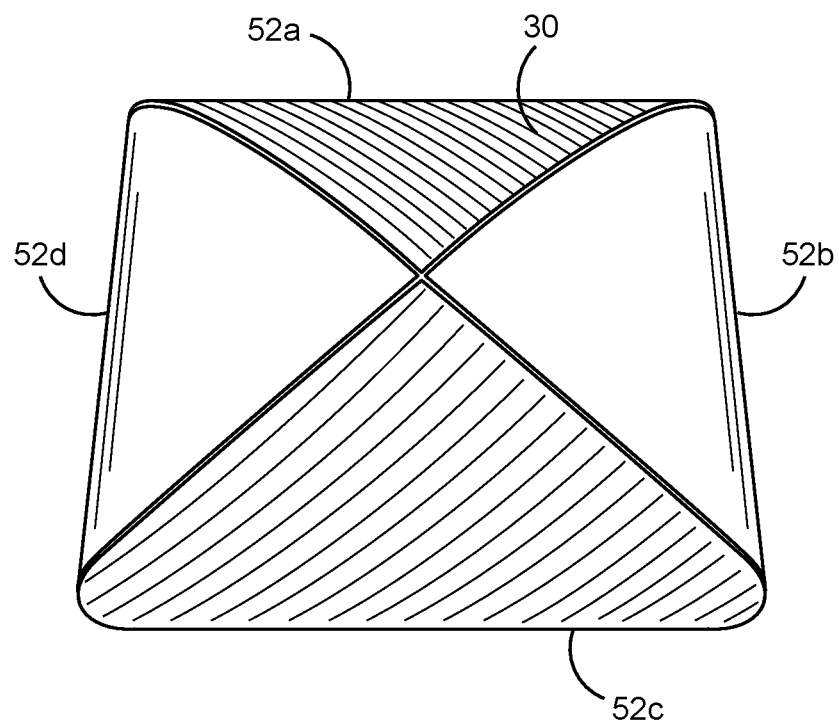
FIG. 5A is a perspective view of another preferred embodiment of the Steinmetz solid connector divided into four pieces identical in shape and size.

In another preferred embodiment shown in FIG. 5A, connector 30 is divided into four Steinmetz quarters, 52a, 52b, 52c, 52d, which are equal in shape and size, and when placed together creates the Steinmetz solid shape. FIG. 5A is a perspective view of the four Steinmetz solid quarters 52a, 52b, 52c, and 52d positioned together to form a Steinmetz solid connector 30. Steinmetz solid quarters 52a, 52b, 52c, and 52d are the four pieces resulting from dividing the Steinmetz solid connector 30 shown in FIG. 3A along cross sections 33 and 35.

Connector 30, halves 40a and 40b, and quarters 52a, 52b, 52c, and 52d can be fabricated by any means known in the art such as three-dimensional printing.

Figure 6:
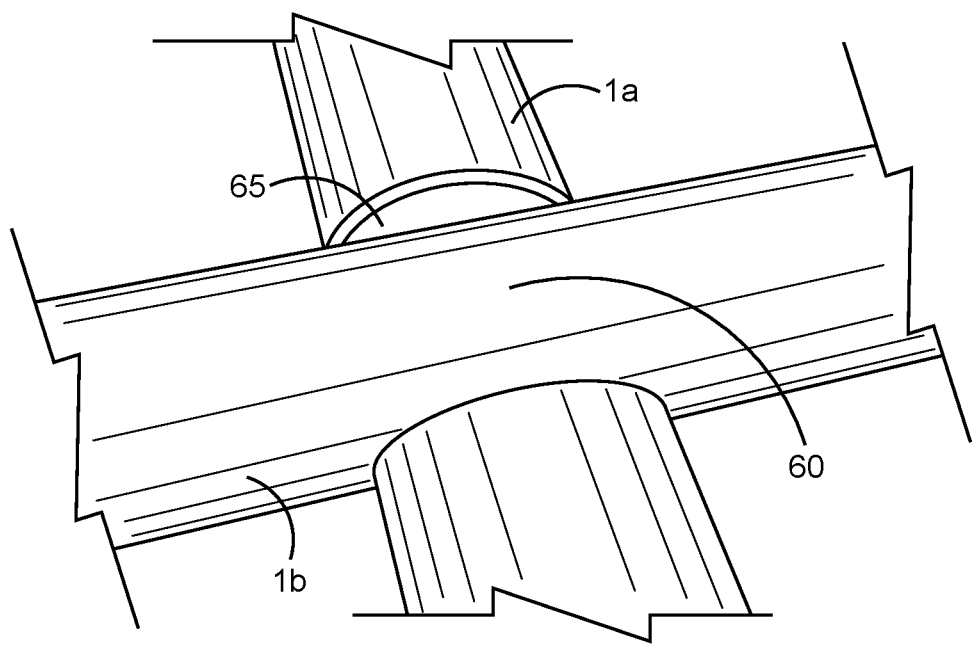
FIG. 6 is a perspective view of the resulting joint created by a method of the subject invention.

The fourth step of the method of the present invention is joining tubes 1a and 1b around connector 30 such that tubes 1a and 1b are aligned orthogonally with cutouts 12 facing one another and the interior surface of tubes 1a and 1b that were exposed by cutout 12 abutting against the surfaces of connector 30. FIG. 6 is a perspective view of resulting joint 60 formed by orthogonally aligning tubes 1a and 1b using a method of the present invention.

Figure 3B:
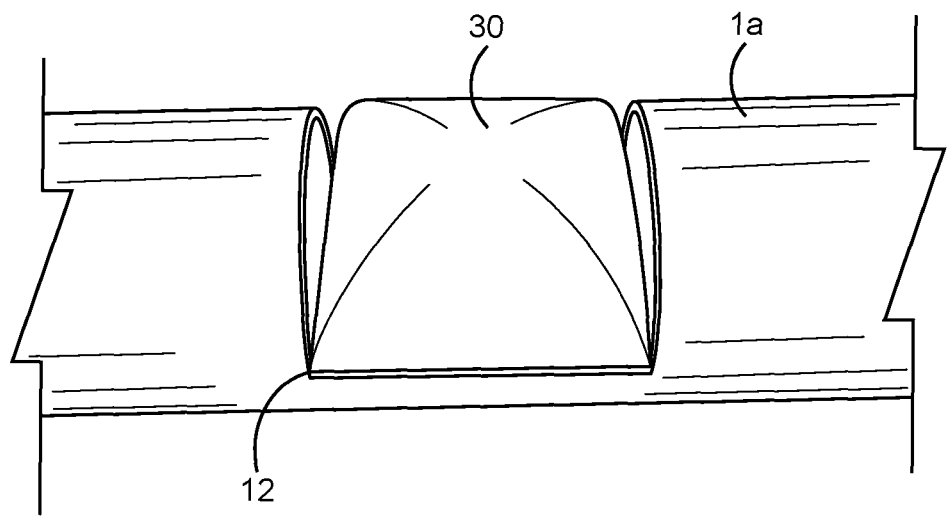
FIG. 3B is a perspective view of the Steinmetz solid shaped connector shown in FIG. 3A inserted and affixed to the inside surface of the first tube in accordance with the fourth step of a method of the subject invention.

In the embodiment where Steinmetz solid connector 30 is a single unit, as shown in FIG. 3A, connector 30 is inserted into first tube 1a through first cutout 12 and the surface of connector 30 that abuts with the inside surface of the first tube 1a that is exposed by cutout 12 is affixed to the inside surface of first tube 1a through the use of an epoxy, glue, adhesive, or any other means for affixing objects together. FIG. 3B is a perspective view of connector 30 inserted into first tube 1a demonstrating first cutout 12 that will accept second tube 1b with an equal external diameter as first tube 1b.

Second tube 1b is positioned so that cutout 12 on tube 1b faces cutout 12 of first tube 1a and first tube 1a is orthogonal in position with relation to second tube 1b and the surface of connector 30 that abuts with the inside surface of second tube 1b is affixed to the inside surface of second tube 1b that is exposed by cutout 12 creating joint 60 shown in FIG. 6. Inside surface of second tube 1b is affixed to the surface of connector 30 using an epoxy, glue, adhesive or any other means for affixing objects together.

In the embodiments where connector 30 comprise more than one piece, each piece is attached to the interior surface of either one of two tubes 1a and 1b. Ideally half the pieces, but at least one piece, are affixed to the interior surface of each tube 1a and 1b, and the pieces are arranged in such a way that when tubes 1a and 1b are aligned orthogonally with cutouts 12 on tubes 1a and 1b facing one another, the pieces form connector 30 having a Steinmetz solid shape.

According to the preferred embodiment wherein the Steinmetz solid comprises two pieces of identical shape and size, connector 30 is bisected along a line connecting opposed corners of connector 30 to create connector halves 40a and 40b as shown in FIG. 4A. Each connector half 40a and 40b demonstrate a planar surface at the point of bisection. According to method of this embodiment, first half 40a is inserted into first tube 1a through cutout 12 and the surface of first half 40a that abuts the interior surface of first tube 1a is affixed to the interior surface of first tube 1a that is exposed by cutout 12 through the use of an epoxy, glue, adhesive, or any other means for affixing objects together. Second half 40b is inserted into second tube 1b through cutout 12 and the surface of second half 40b that abuts the interior surface of second tube 1b is affixed to the interior surface of second tube 1b that is exposed by cutout 12 through the use of an epoxy, glue, adhesive, or any other means for affixing objects together.

Figure 4B:
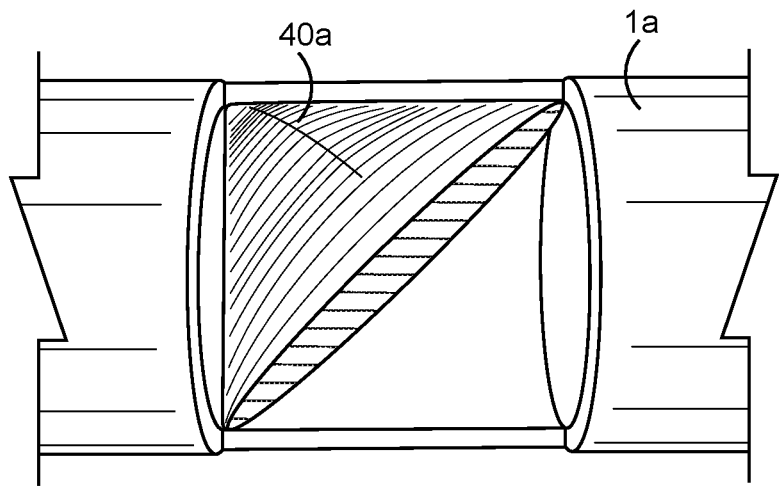
FIG. 4B is a perspective view of one of the Steinmetz solid pieces shown in FIG. 4A inserted and affixed to the interior surface of the first tube in accordance with the fourth step of a method of the subject invention.

In a preferred embodiment shown in FIG. 4B, first tube 1a shown in FIG. 1 is modified to demonstrate cutout 12 that will accept second tube 1b with equal external diameter as first tube 1a. First half 40a is inserted into first tube 1a and the surface of first half 40a that abuts with the interior surface of first tube 1a is affixed to the interior surface of first tube 1a that is exposed by cutout 12.

Similarly, second tube 1b is modified to demonstrate cutout 12 that will accept first tube 1a with an equal diameter as second tube 1b. Second half 40b is inserted into second tube 1b and the surface of second half 40b that abuts with the interior surface of second tube 1b is affixed to the interior surface of second tube 1b that is exposed by cutout 12. Halves 40a and 40b are arranged such that when tubes 1a and 1b are placed in the orthogonal position, with the planar surfaces created by the bisection of connector 30 facing one another, halves 40a and 40b create the Steinmetz solid shape.

In this preferred embodiment, one method of ensuring that halves 40a and 40b will be arranged correctly once tubes 1a and 1b are aligned orthogonally is to arrange and insert both halves 40a and 40b into first tube 1a so that it forms Steinmetz solid connector 30, attaching only first half 40a to the inside of surface tube 1a, and then removing second half 40b when the epoxy, adhesive, or other means for affixing has set. The same method can then be done to second tube 1b by arranging and inserting half 40b and another half identical to 40a into second tube 1b so that the arrangement forms Steinmetz solid connector 30, attaching only half 40b to the inside surface of tube 1b and removing the additional piece identical to half 40a once the epoxy, adhesive, or other means for affixing has set. When the external diameters of tubes 1a and 1b are equal, the result will be two tubes with the arrangement shown in FIG. 4B.

In the preferred embodiment where connector 30 is divided into four quarters 52a, 52b, 52c, and 52d, as shown in FIG. 5A, quarters 52a and 52c are inserted into first tube 1a through cutout 12 and the surfaces of quarters 52a and 52c that abuts the interior surface of first tube 1a are affixed to the interior surface of first tube 1a that is exposed by cutout 12 through the use of an epoxy, glue, adhesive, or any other means for affixing objects together. Quarters 52b and 52d are inserted into second tube 1b through cutout 12 and the surfaces of quarters 52b and 52d that abut the interior surface of second tube 1b is affixed to the interior surface of second tube 1b that is exposed by cutout 12 through the use of an epoxy, glue, adhesive, or any other means for affixing objects together.

Figure 5B:
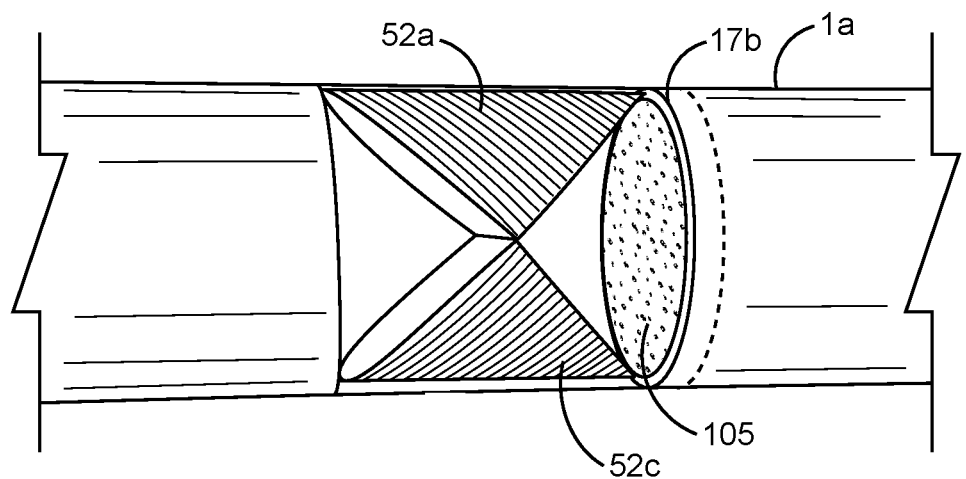
FIG. 5B is a perspective view of two of the Steinmetz solid pieces shown in FIG. 5A inserted and affixed to the interior surface of the first tube in accordance with the fourth step of a method of the subject invention with the optional circular discs utilized.

In a preferred embodiment shown in FIG. 5B, after first tube 1a is modified to demonstrate first cutout 12 that will accept second tube 1b, quarters 52a and 52c inserted into first tube 1a with the exterior surfaces of quarters 52a and 52c that abut with the interior surface of first tube 1a are affixed to the interior surface of first tube 1a.

Similarly, second tube 1b is modified to demonstrate second cutout 12 that will accept first tube 1a. Quarters 52b and 52d are inserted into second tube 1b with the exterior surface of quarters 52b and 52d that abut with the interior surface of second tube 1b is affixed to the interior surface of second tube 1b. Quarters 52a, 52b, 52c, and 52d are arranged such that when tubes 1a and 1b are placed in the orthogonal position quarters 52a, 52b, 53c, and 53d create the Steinmetz solid shape.

In this preferred embodiment, one method of ensuring that quarters 52a, 52b, 52c, and 52d will be arranged correctly once tubes 1a and 1b are aligned orthogonally is to arrange and insert quarters 52a, 52b, 53c, and 53d into first tube 1a so that it forms Steinmetz solid connector 30, attaching only first quarters 52a and 52c to the inside of surface tube 1a, and then removing quarters 52b and 52d when the epoxy, adhesive, or other means for affixing has set. The same method can then done to second tube 1b by arranging and inserting quarters 52b and 52d and two quarter pieces identical to 52a and 52c into second tube 1b so that it forms Steinmetz solid connector 30, attaching only quarters 52b and 52d to the inside surface of tube 1b and removing the additional pieces identical to quarters 52a and 52c once the epoxy, adhesive, or other means for affixing has set. The result will be two tubes with the arrangement of quarter pieces shown in FIG. 5B.

In the preferred embodiments where connector 30 is divided into two or more pieces and the surface of each piece of connector 30 is only affixed to one of the two tubes 1a and 1b, the resulting joint 60 is releasable and temporary, such that joint 60 can be assembled and then at a later time disassembled. In these preferred embodiments, tubes 1a and 1b are aligned orthogonally with cutouts 12 of tubes 1a and 1b facing one another and the interlocking pieces align to form connector 30.

Figure 7:
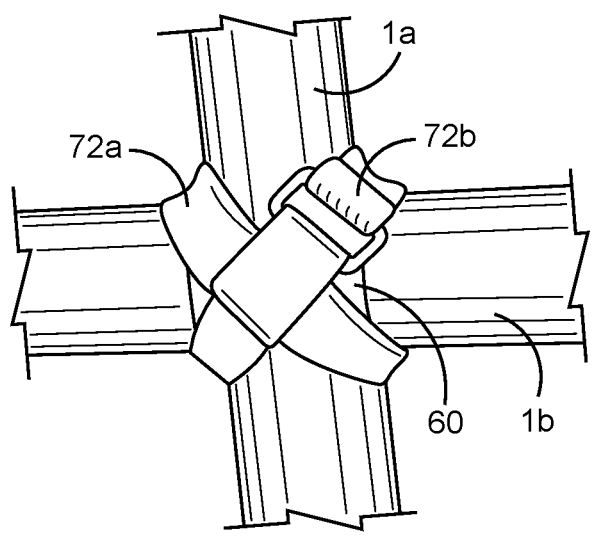
FIG. 7 is a perspective view of a releasable joint with optional crisscrossing straps created by preferred embodiment using a method of the subject invention.

In order to make joint 60 more secure, joint 60 can also be secured together with a means for securing such as using crisscrossing straps 72a and 72b. In the preferred embodiment straps 72a and 72b are made with hook and loop material, but any material used for strapping and/or securing can be used. FIG. 7 is a perspective view of joint 60 that is releasable in the fully assembled state that is secured by two crisscrossing hook and loop straps 72a and 72b.

Alternatively, if the surfaces of each piece that abuts with another piece is affixed together and/or the surfaces of each piece that abuts the interior surface of tube 1a or 1b are affixed together with the use of an epoxy, glue, adhesive, or other means for affixing, joint 60 becomes a fixed joint that is not releasable.

When the tubes 1a and 1b are fitted together orthogonally using the method of the subject invention, crescent-shaped openings are apparent at each side of the cutout, creating a total of four crescent-shaped openings. One of these crescent shaped openings 65 can be seen in FIG. 6. These crescent-shaped openings allow water, sand, dust, lint, and other objects to enter the joint and the adjacent tubing and diminish the aesthetic appearance of the joint.

Consequently, a further refinement of the invention includes attaching optional stabilizing covers to cover each of the crescent shaped openings 65 after the completion of the first step of the above-described method of the subject invention. In addition to making joint 60 waterproof or water resistant and more aesthetically pleasing in appearance, the stabilizing covers also help stabilize joint 60 by adding rigidity to the connection of joint 60. When exterior diameters 15 of tubes 1a and 1b are equal, four stabilizing covers 82a, 82b, 82c, and 82d can be used.

Figure 8A:
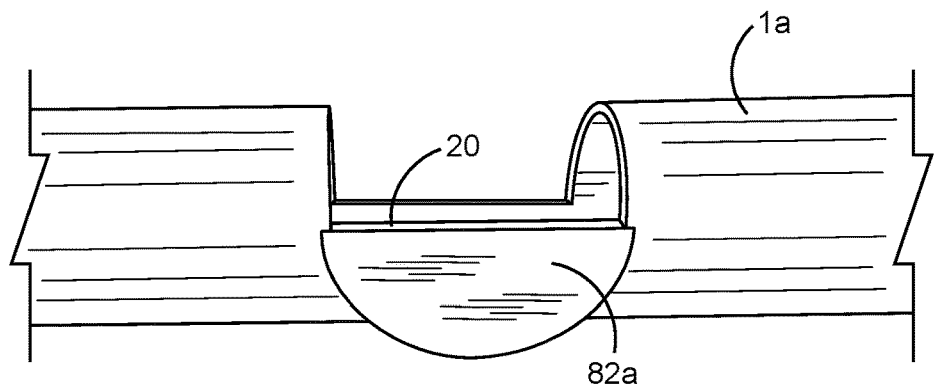
FIG. 8A is a perspective view of a modified first tube with optional stabilizing covers of the subject invention.
Figure 8B:
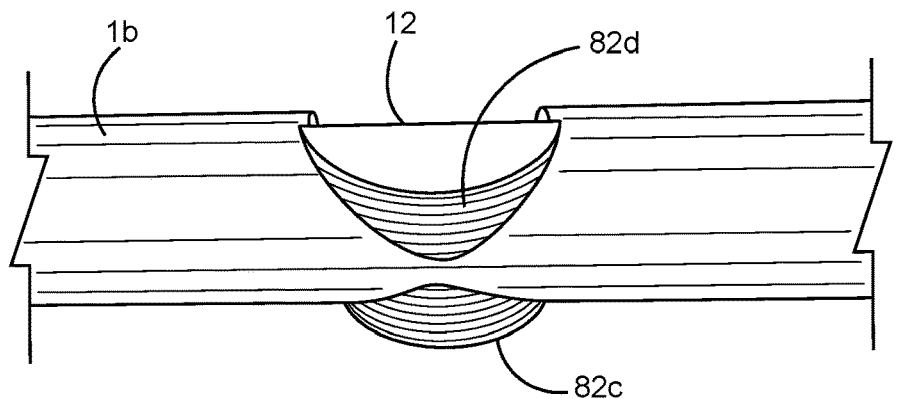
FIG. 8B is a perspective view of a modified second tube with optional stabilizing covers of the subject invention.
Figure 8C:
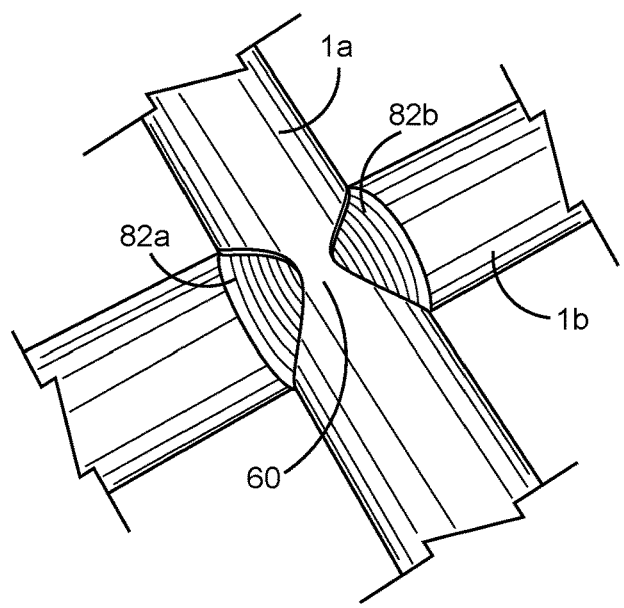
FIG. 8C is a perspective view of the resulting joint created by a method of the subject invention with the optional stabilizing covers utilized.

Stabilizing covers 82a, 82b, 82c, and 82d always appear in pairs and are attached on opposite sides of cutouts 12 of tubes 1a and 1b using epoxy, glue, adhesive, or any other means for affixing objects together. FIG. 8A is a perspective view of first tube 1a after the second step of a method of the present invention with stabilizing cover 82a attached along cutout width 20. FIG. 8B is a perspective view of second tube 1b after the second step of a method of the present invention with stabilizing covers 82c and 82d, each attached along opposite sides of cutout 12. FIG. 8C is a perspective view of the resulting joint 60 with stabilizing covers 82a and 82b shown, when tubes 1a and 1b with equal external diameters are joined orthogonally using a method of the subject invention.

Given the fact that cutout depth 23 of each tube 1a and 1b are half the length of exterior diameters 15, meaning that cutouts 12 cut tubes 1a and 1b half-way through, each cover 82a, 82b, 82c, and 82d must cover an area that is a half circle with a diameter equal to the exterior diameter 15.

Figure 9A:
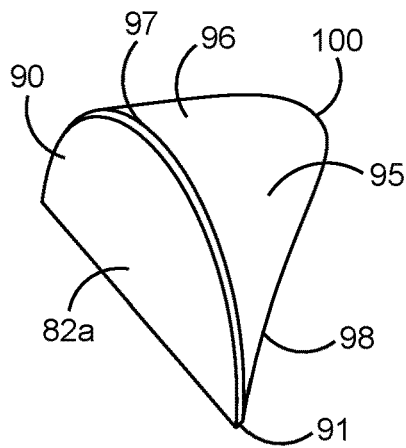
FIG. 9A is a perspective view of the optional stabilizing cover.
Figure 9B:
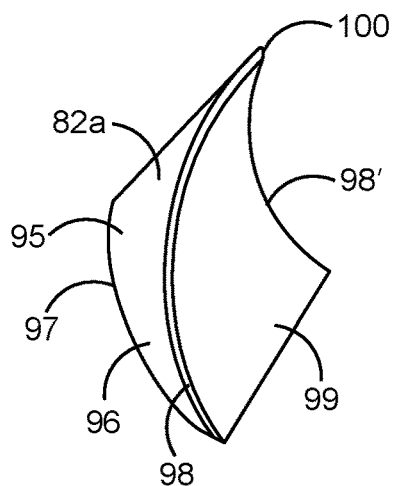
FIG. 9B is another perspective view of the optional stabilizing cover.

FIGS. 9A and 9B are two perspective views of stabilizing cover 82a, which is one of four identical stabilizing covers of a preferred embodiment. Referring to FIGS. 9A and 9B, stabilizing cover 82a is a three-sided, three-dimensional object bounded by a first side 90 (shown in FIG. 9A), a second side 95 (shown in FIGS. 9A and 9B), and a third side 99 (shown in FIG. 9B).

As shown in FIG. 9A, first side 90 is a semicircle with a diameter equal to exterior diameter 15 with a marginal thickness 91.

As shown in FIGS. 9A and 9B, second side 95 has a curved surface 96 and three edges 97 (shown in FIGS. 9A and 9B), 98 (shown in FIGS. 9A and 9B), and 98' (shown in FIG. 9B). When the exterior diameters of tubes 1a and 1b are equal, curved surface 96 (shown in FIGS. 9A and 9B) is congruent to the curvature of exterior surface of tubes 1a and 1b. The length of edge 97 is equal to the arc length of first side 90, or half the circumference of a circle with a diameter equal to exterior diameter 15. Edges 98 and 98' are curved and identical in length, such the distance from the point 100 (shown in FIGS. 9A and 9B) where edges 98 and 98' meet and the center of the length of edge 96 is equal to one-half exterior diameter 15. As shown in FIG. 9B, third side 99 is a curved surface that has the same curvature as the external surface of tubes 1a and 1b and is sized to form a closed volume with first side 90 and second side 95 when sides 90 and 95 abut at a right angle.

In the preferred embodiment of the method of the subject invention, two optional stabilizing covers can be arranged on each side cutout 12 of each tube 1a and 1b. Referring to FIG. 8B stabilizing covers 82c and 82d are arranged one on each side of cutout 12 such that flat side of the semicircle of first side 90 of each stabilizing cover is perpendicular to central axis of tube 1b and aligns with the bottom edge on each side of cutout 12 and the exterior surface of second tube 1b abuts the surface of third side 99. The surface of third side 99 of each of the stabilizing covers 82c and 82d are attached to the exterior surface of second tube 1b using epoxy, glue, adhesive, or other means of affixing two objects together.

When stabilizing covers 82a, 82b, 82c, and 82d are used, cutout widths 20 (shown in FIG. 8A) on both tubes 1a and 1b should be increased by an amount equal to twice thickness 91 to accommodate stabilizing covers 82a, 82b, 82c, and 82d.

Two stabilizing covers are arranged and affixed to each tube 1a and 1b such that the flat edge of the semicircle of first side 90 of each stabilizing cover aligns on each side of the cutout widths 20 of each tube 1a and 1b and the exterior surface of the tube abuts the surface of the third side 99 of the stabilizing cover. The surface of third side 99 of each of the stabilizing covers are attached to the exterior or tube using epoxy, glue, adhesive, or other means of affixing two objects together. As shown in FIG. 8A, the flat edge of the semicircle of first side 90 of stabilizing cover 82a is aligned with the edge of cutout width 20 of tube 1a. FIG. 8B is a perspective view of second tube 1b with stabilizing covers 82c and 82d at each side of cutout 12 of tube 1b.

The invention can be further refined by inserting two optional stabilizing, circular discs into each tube 1a and tube 1b after completion of the second step of method of the subject invention. The circular discs add additional strength to tubes 1a and 1b where they have been modified to create cutouts 12 on tubes 1a and 1b, and provide a means to keep water from entering tubes 1a and 1b from joint 60, or from entering the joint 60 from tubes 1a and 1b, making the resulting joint 60 waterproof.

Figure 10:
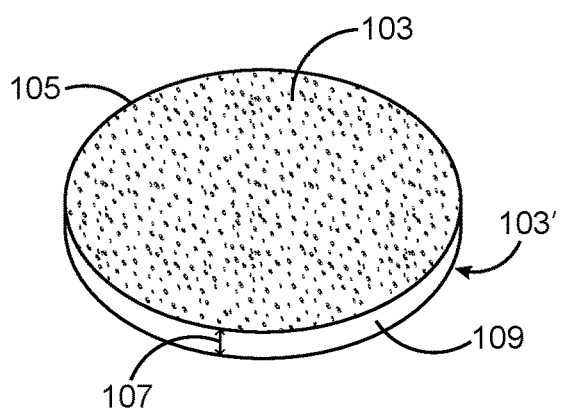
FIG. 10 is a perspective view of the optional circular discs of the present invention.

Referring to FIG. 10, which is a perspective view of disc 105, one of the four identical right circular cylinder discs. Each disc 105 has two circular bases 103 and 103' with a radius equal to one-half interior diameter 13 and a curved surface 109. The length 107 of curved surface 109, which is the distance between circular base 103 and 103', can vary. In a preferred embodiment, length 107 is equal to the thickness of tubes 1a and 1b.

Disc 105 is inserted into tube 1a at exposed half-circular cross section 17a on one side of cutout 12 such that the central axis of disc 105 aligns with the central axis 7 (shown in FIG. 1) of first tube 1a. When inserted in the proper position, the curved surface 109 should abut with the interior surface of tube 1a and circular base 103 should be flush with exposed circular cross section 17a.

Another disc 105 is inserted into tube 1a at exposed half-circular cross section 17b on the opposite side of cutout 12 on tube 1a such that the central axis of disc 105 aligns with the central axis 7 (shown in FIG. 1) of first tube 1a and circular base 103 of disc 105 will be flush with exposed half-circular cross section 17b. When inserted, curved surface 109 should abut with the interior surface of first tube 1a along exposed half-circular cross section 17b. FIG. 5B is a perspective view of disc 105 properly inserted and positioned in first tube 1a with circular base 103 flush with exposed half-circular cross section 17b.

Similarly, two additional discs 105 can be inserted into second tube 1b at exposed half-circular cross-sections 17a and 17b on each side of cutout 12 of tube 1b such that the central axis of each disc 105 aligns with central axis of second tube 1b. When inserted, curved surface 109 of disc 105 should abut with the interior surface of second tube 1b along each side of cutout 12 and circular base 103 of each disc 105 will be flush with exposed half-circular cross sections 17a and 17b of second tube 1b.

The four discs 105 can be attached to tubes 1a and 1b using epoxy, glue, adhesive, or any other means for affixing objects together. Each disc 105 can be fabricated using one or more methods known in the art. For example, a hole saw mounted in a drill press can be used to cut each disc 105 from a rigid material, such as carbon fiber, or each disc 105 can be made with a 3D printer.

In the preferred embodiment where four discs 105 and two halves 40a and 40b (shown in FIG. 4B) are utilized, a lacuna is created in each tube 1a and 1b between the curved surface of half 40a or 40b and circular base 103 of one of the four discs 105. In one embodiment of the method of the subject invention, these lacunas can be filled with epoxy, glue, adhesive, or any other means for affixing objects together.

In another embodiment of the method for the subject invention, instead of tubes 1a and 1b having exterior diameters 15 of the same length, two tubes 1a and 1b that are selected in the first step of the method of the subject invention will have exterior diameters 15a and 15b that differ (the result of differing wall thicknesses of tubes 1a and 1b).

When exterior diameter 15a of tube 1a and exterior diameter 15b of tube 1b differ in size, instead of cutouts 12 that are equal in dimension on both tubes 1a and 1b, the cutouts 12a and 12b that modify tubes 1a and 1b in the second step of the subject invention will differ in dimension. The width on the cutout of the smaller tube will would be the length of the exterior diameter of the larger tube and the width of the cutout on the larger tube would be length of the exterior diameter of the smaller tube.

Figure 11A:
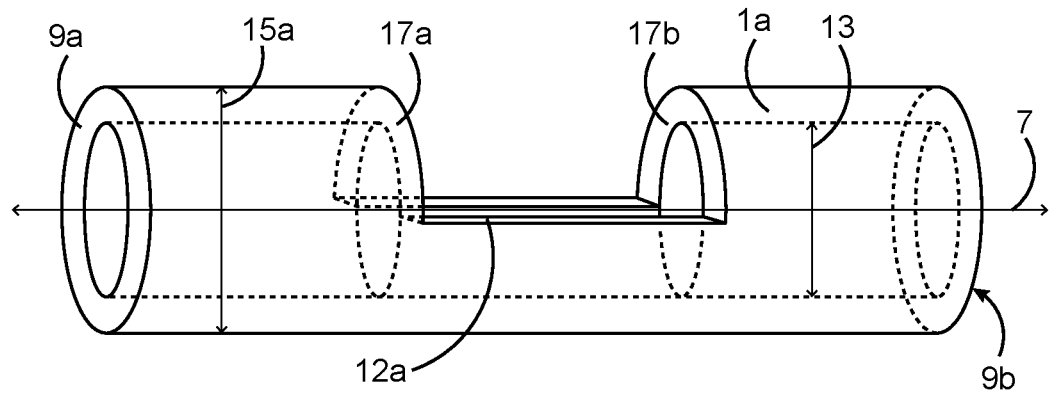
FIG. 11A is a perspective view of another embodiment of the first tube modified according to the second step of a method of the subject invention.
Figure 11B:
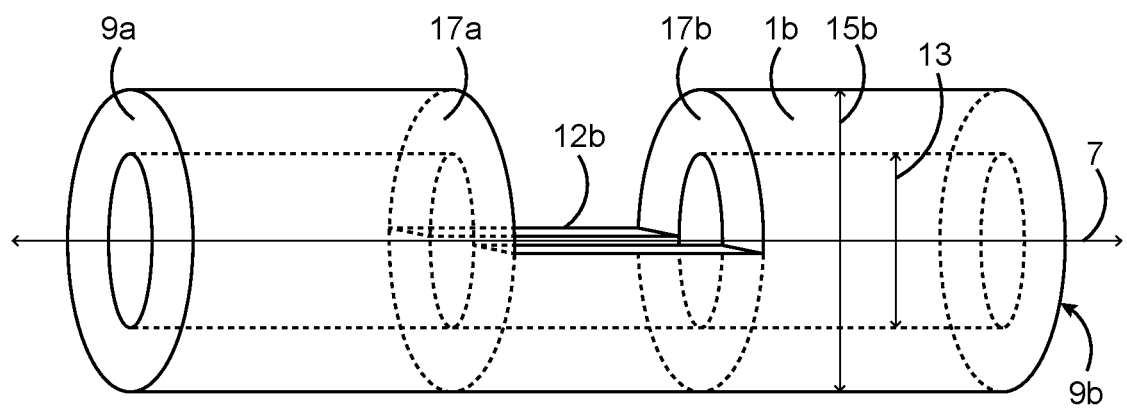
FIG. 11B is a perspective view of another embodiment of the second tube modified according to the second step of a method of the subject invention.

Referring to FIGS. 11A and 11B, identical and identically acting parts carry the same reference numerals as in FIG. 1. In the preferred embodiment shown in FIGS. 11A and 11B, first tube 1a has a smaller exterior diameter 15a than exterior diameter 15b of second tube 1b. FIG. 11A is a perspective view of tube 1a modified with cutout 12a to accept tube 1b with a larger exterior diameter than exterior diameter 15a. FIG. 11B is a perspective view of tube 1b modified with cutout 12b to accept tube 1a with a smaller exterior diameter than exterior diameter 15b. As shown in FIGS. 11A and 11B, once tubes 1a and 1b are modified with cutouts 12a and 12b, each cutout 12a and 12b creates two exposed half-circular cross sections 17a and 17b that are perpendicular to central axis 7 at either side of cutout 12a and 12b.

The size of cutouts 12a and 12b will depend on exterior diameters 15a and 15b of the tubes being used. From the side view, as shown in FIGS. 12A and 12B, cutouts 12a and 12b each have a U-shaped side-profile that have a cutout width 20a and 20b, respectively, and cutout depth 23a and 23b, respectively.

Figure 12A:
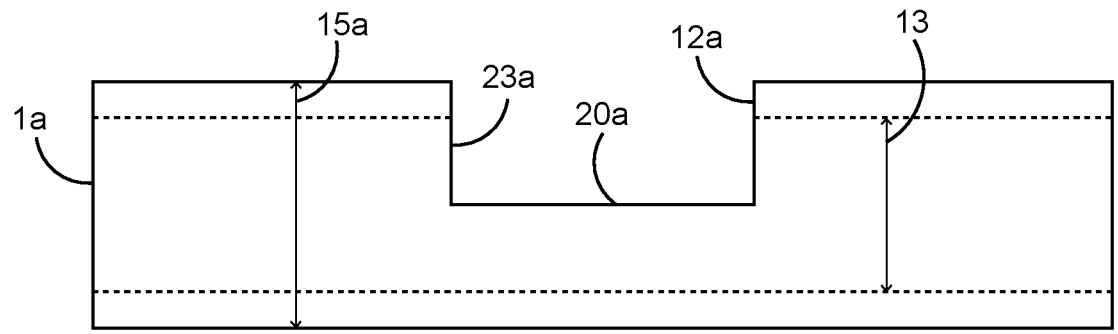
FIG. 12A is a side view of the first tube shown in FIG. 11A modified according to the second step of a method of the subject invention.
Figure 12B:
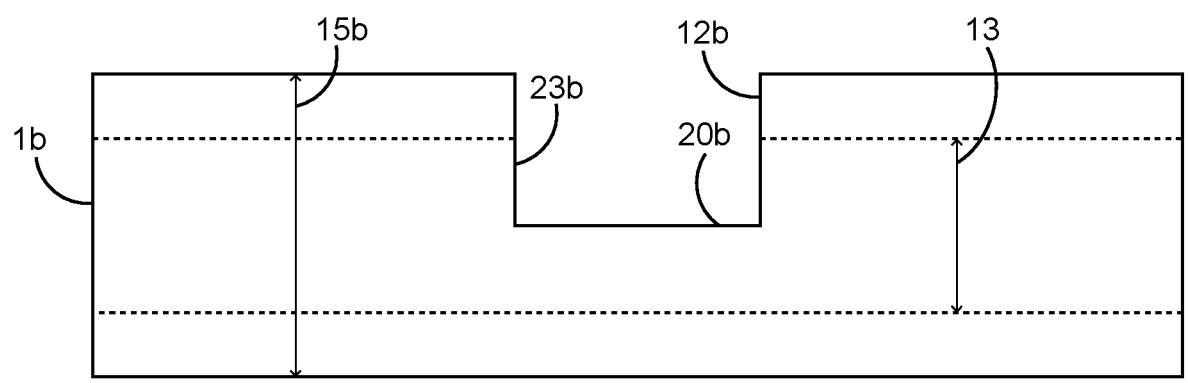
FIG. 12B is a side view of the first tube shown in FIG. 11B modified according to the second step of a method of the subject invention.

Referring to FIG. 12A, the length of cutout width 20a of first tube 1a is equal to the length of exterior diameter 15b of second tube 1b and cutout depth 23a is half the length of exterior diameter 15a. FIG. 12B is a side view of tube 1b shown in FIG. 11B after the second step of a method of the subject invention. The length of cutout width 20b of second tube 1b is equal to the length of exterior diameter 15a of tube 1a and cutout depth 23b is equal to half the length of exterior diameter 15b.

When tubes 1a and 1b have exterior diameters 15a and 15b of differing length, the use of four optional stabilizing covers 82a, 82b, 82c, and 82d described above would leave an obvious gap because when tubes 1a and 1b are orthogonally arranged with cutouts 12 of tubes 1a and 1b facing one another, the tube with the smaller exterior diameter would not fill the cutout of the tube with the larger exterior diameter, since the cutout depth of the larger tube would equal to one half the exterior diameter of the larger tube. Therefore, in another preferred embodiment, the use of two stabilizing covers 82a and 82b and one cutout bridge 113 can be used instead for four stabilizing covers described above. Stabilizing covers 82a and 82b will be placed on the tube with the larger exterior diameter, and cutout bridge 113 will be placed on the tube with the smaller exterior diameter.

When cutout bridge 113 is used, the width of the cutout on the larger tube should be cut to the exterior diameter of the smaller tube plus a small margin to accommodate the bottom edges of the cutout bridge. The width of the cutout on the smaller tube should be cut to the width of the outer diameter of the larger tube, plus a small margin to accommodate the combined thicknesses 91 of the bottom edges of the two stabilizing covers.

In the preferred embodiment shown in FIGS. 11A and 11B, where first tube 1a has a smaller exterior diameter 15a than the exterior diameter 15b of second tube 1b, stabilizing covers 82a and 82b would be affixed to second tube 1b. The semicircular shape of first side 90 of stabilizing covers 82a and 82b would have diameter equal to the length of exterior diameter 15a, which is the exterior diameter of the smaller tube. The curved surface of third side 99 of each stabilizing cover 82a and 82b would have the same curvature as the external surface of first tube 1a.

Figure 13A:
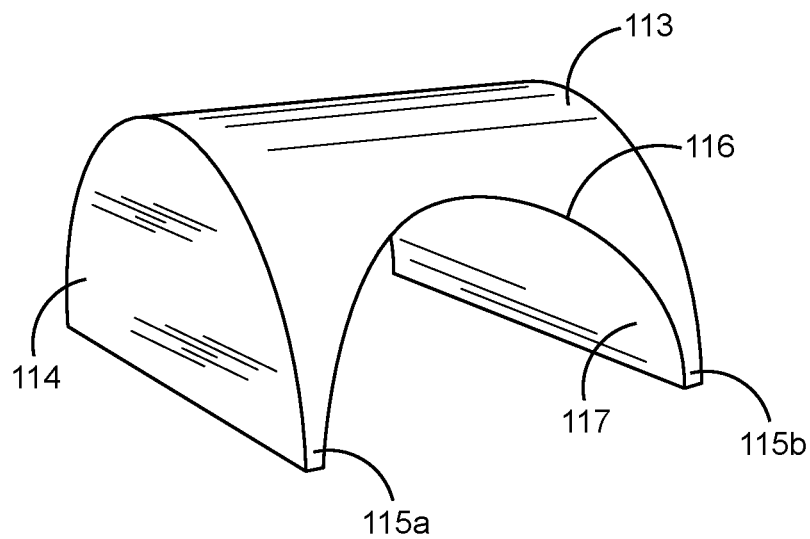
FIG. 13A is a perspective view of the optional cutout bridge of the subject invention.

FIG. 13A is a perspective view of optional cutout bridge 113 for joining tubes 1a and 1b of varying external diameters. Cutout bridge 113 is a three-dimensional shape defined as a semicircular cylinder 114 of radius equal to one-half the exterior diameter of the tube with the larger exterior diameter and a length marginally longer than exterior diameter of the smaller tube, less the volume of a semicircular cylinder 116 of diameter equal to the exterior diameter smaller tube and a length equal to exterior diameter of the larger tube arranged such that the cylindrical axes of semicircular cylinders 114 and 116 intersect orthogonally. Because the length of semicircular cylinder 114 is marginally longer than exterior diameter of the smaller tube, there is a margin 115a and 115b on each side of semicircular cylinder 116.

The concave surface 117 formed by the removal of the volume of semicircular cylinder 116 from semicircular cylinder 114 is affixed to the exterior surface of the tube with the smaller exterior diameter such that the axis of semicircular cylinder 116 aligns with central axis 7 of the tube with the smaller exterior diameter and the straight edge of the semicircular faces of semicircular cylinder 114 align and abut with edge of cutout width of the tube with the smaller exterior diameter.

Figure 13B:
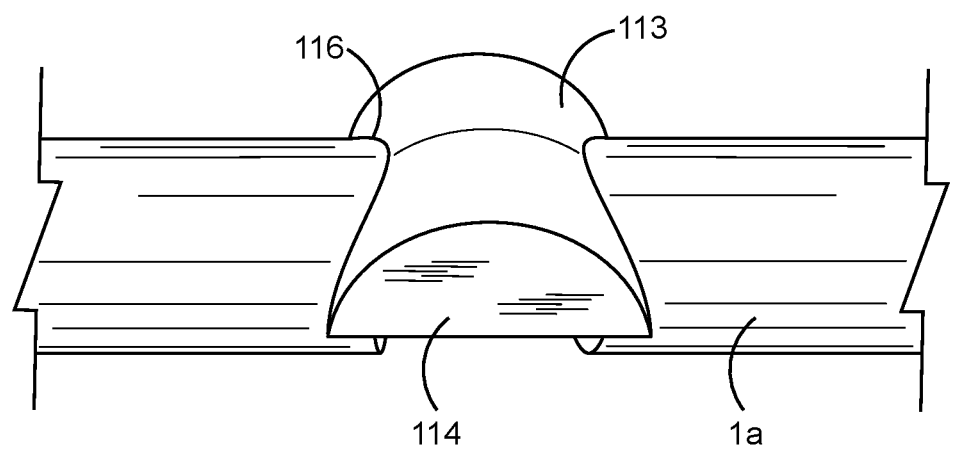
FIG. 13B is a perspective view of the optional cutout bridge affixed to the smaller tube.

FIG. 13B is a perspective view of cutout bridge 113 affixed to the exterior surface of tube 1a, which exterior diameter 15a (shown in FIG. 11A) is smaller in length than the exterior diameter 15b on tube 1b (shown in FIG. 11B). Cutout bridge 113 is affixed to the exterior surface of tube 1a such that the axis of semicircular cylinder 116 aligns with the axis of tube 1a. The straight edge of semicircular cylinder 114 aligns and abuts with the cutout width of tube 1a. In a preferred method of attaching the cutout bridge to the smaller tube 1a, tubes 1a and 1b should be orthogonally positioned to form joint 60. Cutout bridge 113 is then positioned and attached over the top of the smaller tube 1a to ensure cutout bridge 113 has been correctly made and positioned so that it covers the lateral openings of the cutout in the larger tube 1b, making a close fit.

Figure 14A:
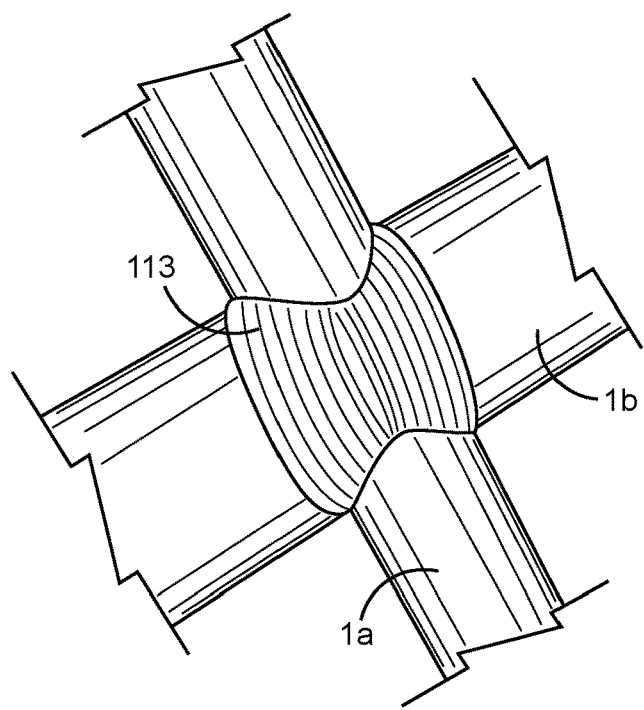
FIG. 14A is a perspective view of a resulting joint created by a method of the subject invention with the optional cutout bridge utilized.
Figure 14B:
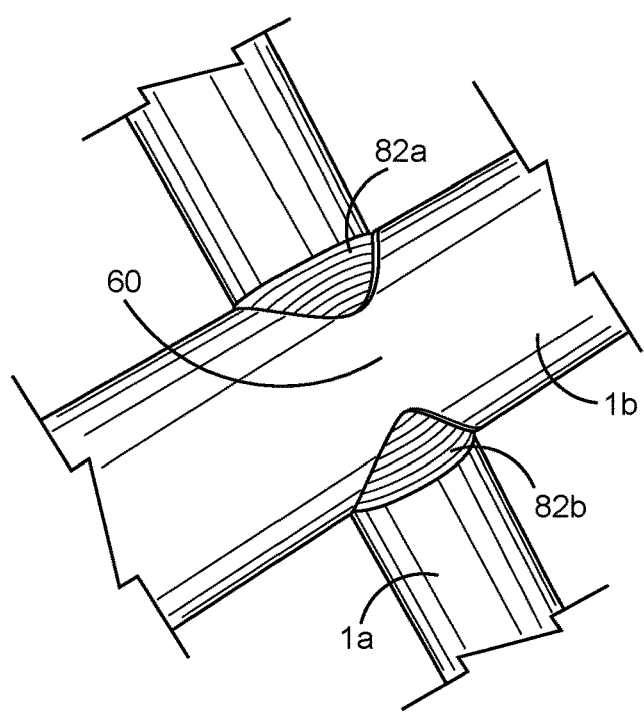
FIG. 14B is another perspective view of a resulting joint created by a method of the subject invention with the optional stabilizing covers utilized.

FIGS. 14A and 14B are perspective views of both sides of the resulting joint 60 created by a method of the subject invention with the optional cutout bridge 113 and two stabilizing covers 82a and 82b utilized. In the perspective view in FIG. 14A, the resulting joint is covered by cutout bridge 113 affixed to tube 1a, which has a smaller exterior diameter than tube 1b. The perspective view in FIG. 14B shows two stabilizing covers 82a and 82b affixed to tube 1b, which has the larger exterior diameter than tube 1a.

For the fixed version of joint 60, epoxy, glue, adhesive, or other can be liberally applied to the bases of the notched bridge and lateral "openings" of the cutout of the larger tube, edges of the cutout, and all interfacing surfaces of the internal parts of the Steinmetz solid. Straps may be used in lieu of a clamp until the adhesive has fully hardened, and then straps may be removed.

Figure 15A:
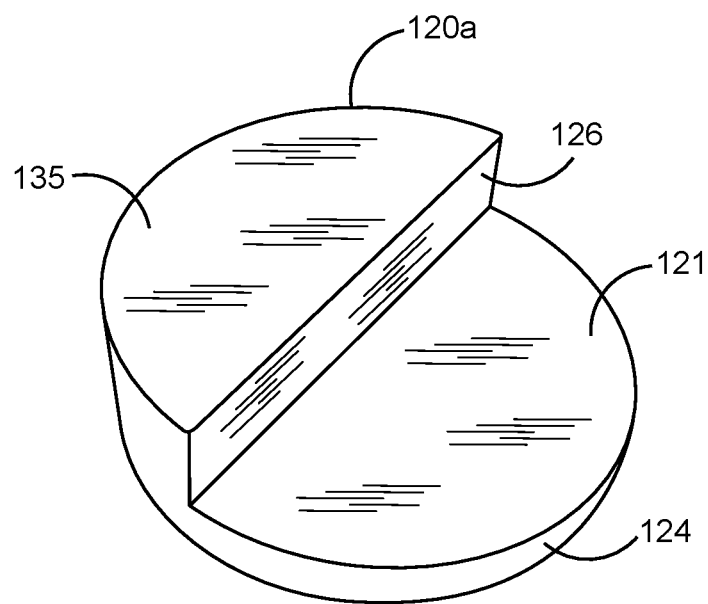
FIG. 15A is a perspective view of the optional stepped stopper.

When exterior diameters of tubes 1a and 1b are unequal, two identical stepped stoppers 120a can be used in place of circular discs in the tube with the smaller external diameter. FIG. 15A is a perspective view of stepped stopper 120a. As shown in FIG. 15A, stepped stopper 120a is a circular disc 121 with a diameter equal to internal diameters 13 of the two tubes and a thickness 124 joined axially with a semicircular disc 135 with a diameter equal to internal diameter of the tubes and a thickness 126. Thickness 126 is equal to one-half the tube wall of the tube with the larger exterior diameter. In a preferred embodiment, thickness 124 is equal to the thickness of the tube wall of the tube with the smaller exterior diameter, however thickness 124 can vary.

Figure 15B:
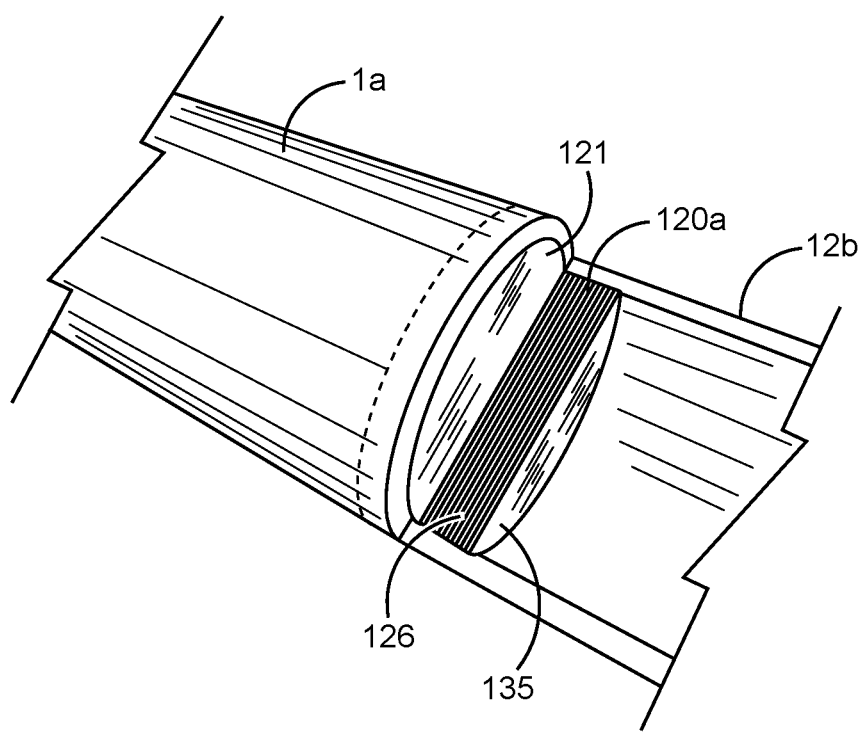
FIG. 15B is a perspective view of the optional stepped stopper inserted into the smaller tube.

FIG. 15B is a perspective view of stepped stopper 120a properly inserted and positioned in first tube 1a with circular disc 121 flush with exposed half-circular cross section 17a. Identical and identically acting parts carry the same reference numerals as in FIG. 15A. Referring to FIG. 15B, a preferred method of the subject invention uses the modified tubes shown in FIG. 11A, with first tube 1a having a smaller exterior diameter 15a than the exterior diameter 15b of second tube 1b. After tube 1a is modified with second cutout 12a, two stepped stoppers 120a are affixed to the interior surface of tube 1a at the two exposed half-circular cross sections 17a and 17b created by cutout 12a such that the axes of circular disc 121 of each stepped stopper 120a align with the center axis 7 of first tube 1a (shown in FIG. 11A).

After second tube 1b is modified with cutout 12b, two circular discs with diameter equal to interior diameters 13 are affixed to the inside surface of second tube 1b at the two exposed circular cross sections 17a and 17b of second tube 1b, as described above, such that the axes of each disc 105 are aligned with central axis 7 of second tube 1b (shown in FIG. 11B).

The subject invention also comprises a kit for joining cylindrical tubes to form strong orthogonal joints. The kit would include one or more of the following elements: a tool for producing cuts in said cylindrical tubes of specified width and depth as described above; a Steinmetz solid connector having shape defined by the volume of intersection of two cylindrical volumes of equal diameter with orthogonally intersecting cylindrical axes; and adhesive(s) for attaching said cylindrical tubes and connector.

Additionally or optionally, the kit could further comprise one or more of the following auxiliary parts: (1) straps or other means for a releasably securing the joint as described above, (2) four circular discs as described above each with a diameter equal to the internal diameter of the cylindrical tubes, (3) four stabilizing covers as described above, (4) two stabilizing covers and a cutout bridge as described above, and/or (5) two circular discs and two stepped stoppers as described above.

SUMMARY AND SCOPE

The above described invention could have a number of applications, including, but not limited to, creating modular wings and lightweight furniture and camping equipment.

With respect to modular wings, joints in current wing structures such as power generating wind turbines, wingsails, and aircraft wings, are permanently fixed and cannot be disassembled, which greatly limits the potential use of wings in many important areas. The subject invention could be applied to each of these types of permanently fixed wings to create modular wings.

Wind driven turbines that produce electricity for the power grids around the world have become a multi-billion-dollar industry, and—perhaps most importantly—provide hope that we may save earth from further carbon-induced climate change. The three long, thin carbon-fiber blades in use on today's wind turbines have the advantages of being fairly lightweight, low maintenance and easy to clean. They are, on the other hand, far less efficient in capturing wind energy than wings that more closely resemble aircraft wings. This is true because the principles of aerodynamics that produce lift for airplanes are the same as those that produce thrust for wind turbines. Wind turbine blades resembling aircraft wings could be made using modern fabrics like Kevlar® (widely used by sailboats) stretched across a carbon-fiber frame made using the subject invention. The subject invention would make the blades modular so that they could be easily removed, cleaned, serviced and placed back into use. Such an application would solve the weight and cleaning issue while providing a greater power producing output that would offset the cleaning and maintenance costs.

A wingsail is a variable-camber aerodynamic structure that is fitted to a marine vessel in place of conventional sails. Wingsails are analogous to airplane wings, except that they are designed to provide lift on either side to accommodate being on either tack. Whereas wings adjust camber with flaps, wingsails adjust camber with a flexible or jointed structure (for hard wingsails). Wingsails are typically mounted on an unstayed spar—often made of carbon fiber for lightness and strength. The geometry of wingsails provides more lift, and a better lift-to-drag ratio, than traditional sails. Wingsails are more complex and expensive than conventional sails. None of today's wingsails are modular. With today's non-modular wingsails, the Kevlar® fabric that covers the carbon-fiber frames are glued (epoxied) to the ribs. This presents problems that only a team of experienced Kevlar® and carbon-fiber fabricators and construction experts can handle. And these fabricators and experts need to be on site at every race or other sailing outing. Applying the subject invention to create a modular wingsail would solve many problems that non-modularity presents, including issues with fabric stretching and crashes.

First, all fabrics stretch, even the latest Dacron and Kevlar® weaves specifically designed not to stretch, over time will stretch. A modular wing would have its fabric spread across its frame and fastened with cleated ropes or ties or any number of methods, and the surfaces of the fabric that abutted the ribs would use attached velcro strips to secure the fabric to the ribs (instead of glue). Maintenance of a wings ail would include pulling the fabric-covering loose from its velcro attachment, repositioning it, smoothing out any wrinkles, cinching it down, and then pressing the abutting fabric down onto the ribs' velcro strips again.

Second, some boats using wingsails are topping 50 mph. They are flying above the water on foils, and while this sort of sailing is relatively new, and a great deal of effort has been made to reduce the number of crashes, crashes remain a regular occurrence, and they frequently involve structural damage to the wing's frame and occasionally tears in the wing's fabric covering. Torn fabric is easily repaired. Broken ribs are not. If wingsails were in wide use, the availability of spares for every piece of a wing's frame would be easily available and relatively inexpensive.

The subject invention could also be used to improve aircraft wings that are covered with fabric like the Bellancas. Bellancas in their day broke all the records for Atlantic crossings, first aircraft in inter-island air service in Hawaii, speed records, etc. Designed by an Italian genius, and built by hand, almost everyone who loved flying wanted a Bellanca. There may be a market if the aeronautical specifications of the external surfaces of the Bellanca Super Viking could be used to reinvent that aircraft using the same engine and avionics, but replacing the wood and heavily doped and painted cloth with carbon-fiber modular wing structures covered with Kevlar® fabric, The subject invention could also be used to improve wind tunnels, exhaust fans, and large blowers of every type. Similar to the described improvements of wings discussed above, the same could be applied to create modular blades for wind tunnels, exhaust fans and large blowers. However, unlike wingsails, whose airfoil shape is symmetrical to provide lift on either tack, wind turbines, blowers, and fans would have an asymmetrical shape appropriate to function.

With respect to lightweight furniture and camping equipment, the subject invention could be used to create an improved portable chair. Portable chairs generally come in only two or three varieties. None of them are something a person would pack in their luggage for travel on an airplane, primarily because they are too bulky and too cheap. Foldable chairs, and long-pole deep bag-type chairs do not fit into a normal suitcase either, or take up too much room. Given the fact that such chairs generally are cheaply made with inexpensive materials, they wind up in landfills or fill the bottom of lakes and lagoons, clog waterways, and trash the landscape. The subject invention can be used to create a high end, comfortable, elegant looking portable chair that travelers would keep in their luggage when not in use. For example, such a chair could have an orthogonally joined, and strapped together pair of carbon-fiber tubes approximately fourteen inches in length to form the base of such a chair.

The subject invention could also be used to improve tents and other portable living quarters. There is a global need for quality portable living quarters, beyond simple tents. Portable chairs, and similarly constructed platforms for air mattresses, quickly constructed and collapsed tables and other furniture, enclosed living quarters with room to stand up, all could all be made using the subject invention.

Although the description above contains many specificities, these should not be construed as limiting the scope of the invention but merely providing illustrations of some of the presently preferred embodiments of this invention. Thus, the scope of the invention should be determined by the appended claims and their legal equivalents, rather than by the examples given.

For example, use of the term "epoxy" or "epoxied" is not intended to imply that Epoxy—and only Epoxy—is required for these embodiments. For all purposes in this application, any "adhesive," "glue," means for "gluing", "welding", and/or "attaching" known to the art can be used.

Also, whereas some embodiments describe bisected or quartered Steinmetz solids, the process for making such connectors need not involve bisection or quartering but, instead, such connector pieces may be formed individually to exhibit the size and shape of a bisected or quartered integral Steinmetz solid.

Additionally, although the descriptions above specify carbon fiber material, it is anticipated that any rigid material may be substituted for the carbon fiber material described.

The terms "cylinder", "pipe", and/or "tube" may be used interchangeably, and will always mean a right circular cylinder, i.e., a cylinder with the bases circular and with the axis joining the two centers of the bases perpendicular to the planes of the two bases. It is anticipated that applications for Steinmetz solid technology will involve carbon fiber tubing, hence the term "tube" will replace the term "cylinder" and/or "pipe" for the most part.

Unless otherwise specified, the joints described herein are orthogonal, i.e., the two cylinders/tubes intersect at right angles.

The Steinmetz solid joint's intended use is structural, to be distinguished from orthogonally joined pipes used to convey fluids (water, gas, oil, sewage, packages via pneumatic tubes, etc.). Unlike these, Steinmetz solid technology joins together two tubes orthogonally primarily for structural applications.

Although some embodiments are shown to include certain features, it is specifically contemplated that any feature disclosed herein may be used together or in combination with any other feature on any embodiment of the invention. It is also contemplated that any feature may be specifically excluded from any embodiment of the invention.

As used herein, the following terms and variations thereof have the meanings given below, unless a different meaning is clearly intended by the context in which such term is used. "A," "an", and "the" and similar referents used herein are to be construed to cover both the singular and the plural unless their usage in context indicates otherwise.

"Comprise" and variations of the term, such as "comprising" and "comprises," are not intended to exclude other additives, components, integers, or steps.

Unless otherwise indicated, all numbers, dimensions, materials, and so forth used in the specification and claims are to be understood as being examples and not limitations, and in any event, should not be construed as an attempt to limit the application of the doctrine of equivalents to the scope of the claims.

All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Certain embodiments are described herein, including the best mode known to the inventor for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein.

Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context. The invention should therefore not be limited by the above described embodiment, method, and examples, but shall be deemed to include all embodiments, methods, and equivalents within the scope and spirit of the invention as claimed.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

I claim:

1. A method for joining two cylindrical tubes to form a strong orthogonal joint, comprising:
   a. providing two said tubes of equal internal diameters;
   b. modifying each said tube to demonstrate a cutout at the location of the intended joint to expose a section of the inside surface of said tube, said cutout on the first tube having a depth equal to one half the external diameter of said first tube and a width equal to the external diameter of the second said tube, and said cutout on said second tube having a depth equal to one half the external diameter of said second tube and a width equal to the internal diameter of said first said tube;
   c. providing a bicylinder Steinmetz solid connector having a shape defined by the volume of intersection of the hollow regions of said tubes when said tubes are joined orthogonally with said cutouts facing one another; and
   d. assembling said connector and tubes by joining said tubes orthogonally around said connector with cutouts facing one another such that said connector occupies said volume of intersection and the surfaces of said connector abut the inside surface sections exposed by said cutouts.

2. The method of claim 1 wherein said connector comprises a single piece.

3. The method of claim 1 wherein the assembly step further comprises securing the surfaces of said connector to said inside surface sections exposed by said cutouts with adhesive.

4. The method of claim 1 wherein said Steinmetz solid connector is comprised of a plurality of pieces.

5. The method of claim 4 wherein said connector is comprised of two identical half-connectors each exhibiting a shape obtained by bisecting the Steinmetz solid between one set of opposed corners to form half connectors each having a curved surface and a planar surface.

6. The method of claim 5 wherein the assembly step further comprises first forming two assemblies each comprising a tube and a half-connector by aligning and adhering each said tube with a single said half-connector such that said inside surface sections exposed by said cutouts abut half of the curved surface of said half-connectors, and second securing said assemblies with adhesive such that the exposed planar surface of each assembly abut one another.

7. The method of claim 5 wherein the assembly step further comprises:
   a. forming two assemblies each comprising a tube and a half-connector by aligning and adhering each said tube with a single said half-connector such that said inside surface sections exposed by said cutouts abut half of the curved external surface of said half-connectors; and
   b. providing at least one strap to secure said assemblies;
   c. joining said assemblies such that the exposed planar surface of each assembly abut one another;
   d. securing said assemblies by lashing said strap around the resulting joint.

8. The method of claim 4 wherein said connector comprises four identical quarter-connectors each exhibiting a shape obtained by bisecting the Steinmetz solid between both sets of opposed corners to form quarter-connectors each having a curved surface and two planar surfaces.

9. The method of claim 8 wherein the assembly step further comprises first forming two assemblies each comprising a tube and two quarter-connectors by aligning and adhering each said tube with two said quarter-connectors such that said inside surface sections exposed by said cutouts abut half of the curved surface of said quarter-connectors, and such that said quarter-connectors are aligned to meet in an X-shape at the line of intersection of their planar surfaces, and second securing said assemblies with adhesive such that the exposed planar surfaces of each assembly abut one another.

10. The method of claim 8 wherein the assembly step further comprises:

a. forming two assemblies each comprising a tube and two quarter-connectors by aligning and adhering each said tube with two said quarter-connectors such that said inside surface sections exposed by said cutouts abut half of the curved external surface of said quarter-connectors, and such that said quarter-connectors are aligned to meet in an X-shape at the line of intersection of their planar surfaces; and b. providing at least one strap to secure said assemblies;

c. joining said assemblies such that the exposed planar surfaces of each assembly abut one another; and d. securing said assemblies by lashing said strap tightly around the resulting joint.

11. The method of claim 1 wherein said tubes are of equal external diameter and further comprising providing four stabilizing covers, each having a shape defined by the volume bounded by the following three surfaces: the first, a planar surface congruent to a semicircle of diameter equal to the external diameter of said tubes, the second, a curved surface congruent to one octant of the surface of said Steinmetz solid of which the long uncurved side abuts the first said surface at its diameter, and the third, a section of the surface of a cylinder of diameter equal to the external diameter of said tubes sized to form a closed volume with the first and second said surfaces and aligned so that the third surface abuts the first said surface at a right angle; adhering the two said stabilizing covers to each said tube such that the diameter of the semicircular surface of said stabilizing covers abut the straight edge of said cutouts and such that the first said surface of said stabilizing covers are facing away from the cylindrical axes of each tube; and wherein the assembly step further comprises joining said connector with the inward facing curved surfaces of each said stabilizing cover such that said cutouts are completely enclosed.

12. The method of claim 1 wherein said tubes are not of equal external diameter and further comprising: providing two stabilizing covers, each having a shape defined by the volume bounded by the following three surfaces: the first, a planar surface congruent to a semicircle of diameter equal to the external diameter of the larger of said tubes, the second, a curved surface congruent to one octant of the surface of said Steinmetz solid of which the long uncurved side abuts the first said surface at its diameter, and the third, a section of the surface of a cylinder of diameter equal to the external diameter of the larger of said tubes sized to form a closed volume with the first and second said surfaces and aligned so that the third surface abuts the first said surface at a right angle; providing a cutout bridge of shape defined as the solid volume of a semicircular cylinder of diameter equal to the external diameter of the larger of said tubes and of length marginally longer than the external diameter of the smaller of said tubes less a semicircular cylinder of diameter equal to the external diameter of the smaller of said tubes and of length equal to the external diameter of the larger of said tubes arranged such that the cylindrical axes of the two said semicircular cylinders intersect orthogonally; adhering the said two stabilizing covers to the larger of said tubes such that the diameter of the semicircular surface of said stabilizing covers abut the straight edge of said cutout and such that the semicircular surface of said stabilizing covers are facing away from the cylindrical axes of said tube; adhering the cutout bridge such that its concave surface abuts the external surface of smaller of said tubes; and wherein the assembly step further comprises joining said connector with the inward facing curved surfaces of each said stabilizing cover and cutout bridge such that the cutouts in step b are completely enclosed.

13. The method of claim 1 wherein said tubes have equal external diameters, further comprising providing four circular discs of diameter equal to the internal diameter of said tubes and thickness equal to the tube thickness defined by the distance between the inner and outer tube diameters, and affixing said circular discs to occupy the four exposed circular cross sections of said tubes formed by said cutouts prior to said assembly step.

14. The method of claim 1 wherein said tubes have unequal external diameters, further comprising providing two circular discs each of diameter equal to the internal diameter of said tubes and thickness equal to the thickness of the larger of said tubes defined by the distance between the inner and outer tube diameters, and affixing said circular discs to occupy the two exposed circular cross sections of the larger of said tubes formed by said cutouts, and further providing two stepped stoppers each of volume equal to a circular disc of diameter equal to the internal diameter of said tubes and thickness equal to the thickness of the smaller of said tubes defined by the distance between the inner and outer tube diameters joined axially with a bisected circular disc of diameter equal to the internal diameter of said tubes and thickness equal to the thickness of the larger of said tubes, and affixing said stepped stoppers to the two exposed circular cross sections of the smaller of said tubes such that the circular axes of said stepped stoppers is aligned with the cylindrical axis of said tube.

\* \* \* \* \*